P. B. DONAHOO.
VEHICLE SPRING.
APPLICATION FILED SEPT. 9, 1913.

1,129,796.

Patented Feb. 23, 1915.
2 SHEETS—SHEET 1.

WITNESSES:
H. A. Stock
J. J. Robb

INVENTOR
Peter B. Donahoo
BY
Harry C. Schroeder
ATTORNEY

P. B. DONAHOO.
VEHICLE SPRING.
APPLICATION FILED SEPT. 9, 1913.
1,129,796.
Patented Feb. 23, 1915.
2 SHEETS—SHEET 2.
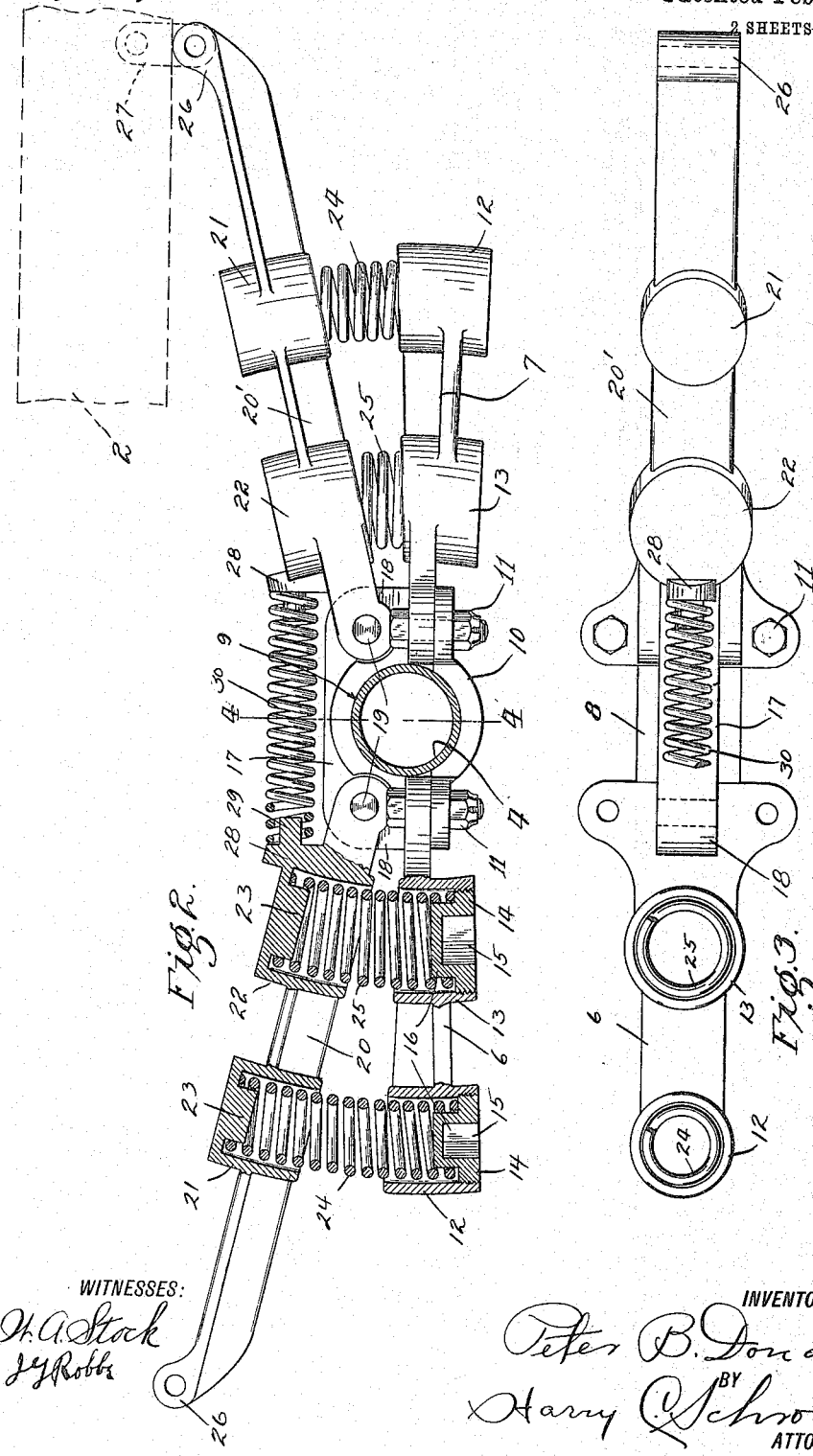
WITNESSES:
W. A. Stock
J. J. Robbs
INVENTOR
Peter B. Donahoo
BY
Harry Schroeder
ATTORNEY

UNITED STATES PATENT OFFICE.

PETER B. DONAHOO, OF OAKLAND, CALIFORNIA.

VEHICLE-SPRING.

1,129,796.  Specification of Letters Patent.  Patented Feb. 23, 1915.

Application filed September 9, 1913. Serial No. 788,940.

*To all whom it may concern:*

Be it known that I, PETER B. DONAHOO, a citizen of the United States, residing at Oakland, in the county of Alameda and State of California, have invented certain new and useful Improvements in Vehicle-Springs, of which the following is a specification.

This invention relates to automobile springs of the helical type and has for its object the construction of a spring device using helical springs with the advantages of the elliptical type.

The principal object of my invention is to construct a device wherein the resiliency of the spring will be proportional to the load.

As is well known, with the present elliptical springs of various forms a car containing a single passenger rides very hard whereas when fully loaded the riding qualities are considerably improved. With my device the first load applied produces a greater deflection than successive increments.

Another object is the production of a device wherein the springs may be easily renewed and the parts conveniently carried.

Figure 1:
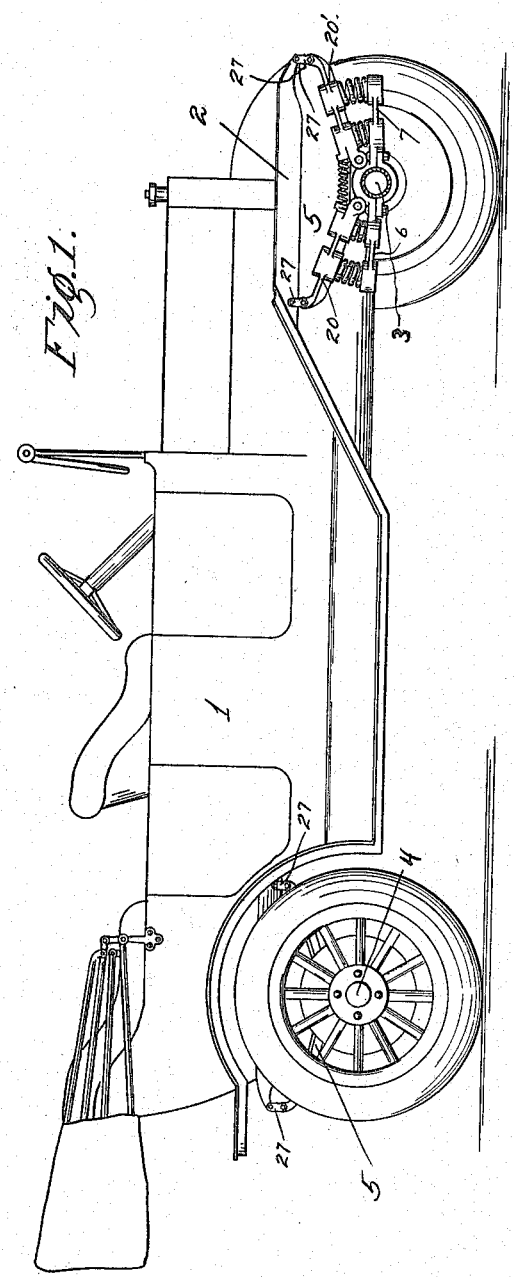
Figure 4:
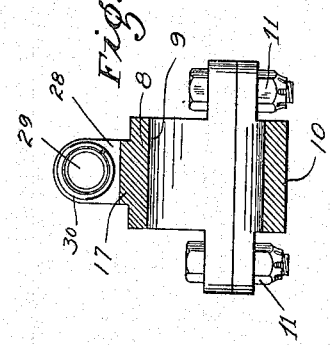

With these and other objects in view my invention consists in the novel construction and arrangement of parts as herein described and illustrated in the accompanying drawings wherein, Figure 1 is a view in side elevation of a car fitted with the improved springs, the front wheel being removed to better show the application. Fig. 2 is a view in side elevation of the spring device with parts in section. Fig. 3 is a view in plan of the same with one of the hinged arms removed. Fig. 4 is a view in section on 4—4 Fig. 2.

Denoting corresponding parts by the same numerals of reference, 1 is the car body having the usual longitudinal frame members 2 to which the springs are attached. The front and rear axles are denoted by 3 and 4 and my spring device in general by 5. The latter consists of the arms 6 and 7 rigidly connected together by the central portion 8 which is shaped to fit the axle on which it is used. In this case the tubular axle is shown so that a semicircular seat 9 is formed central with the arms, and a correspondingly shaped clamp plate 10 is employed to fasten the device to the axle, these parts being drawn together by bolts 11.

On each of the arms are formed two cylindrical spring seats 12 and 13 and in practice I prefer to make the former slightly smaller in diameter. Each seat is provided with a threaded removable bottom plug 14 having a wrench socket 15 and the spring retaining lug 16.

Central with portion 8 I provide a rib 17 having laterally extending ears 18 to which are pivotally fastened arms 20 and 20'. These arms carry cylindrical spring seats 21 and 22 similar in shape and in alinement with seats 12 and 13 respectively. The bottoms of these seats may be made integral therewith and are provided with spring retaining lugs 23. Interposed between the pairs of spring seats are helical springs 24 and 25, while the arms 20 and 24 are extended and terminate in heads 26 which are fastened to the frame member 2 by links 27. On spring seats 22 are provided bosses 28 having laterally projecting pins 29 on which is seated a helical compression spring 30, which serves to catch the rebound of the car.

The operation of this device is as follows:—When the wheel strikes an obstruction, the axle is lifted raising arms 6 and 7 which in turn throws springs 24 and 25 into compression and spring 30 to expand. By varying the length and strength of these springs any desired degree of resiliency may be obtained. For instance when attached to the car with no passengers therein spring 24 may be in compression and 25 normal or even in tension so that a light load effects only spring 24 but as the load increases the spring 25 comes into play. This action can also be helped out by spring 30 as this spring is in compression under normal conditions and acts against spring 24 during the first movement thereof.

Thus it will be seen I have provided an effective device for the purpose hereinbefore set forth and it will of course be understood that I do not limit myself to the exact construction illustrated but wish to include all such modifications as properly fall within the scope of the annexed claims.

What I claim as new is:—

1. In combination with a frame, an axle of a resilient structure secured therebetween, a hub for said structure removably secured to said axle, horizontally disposed arms provided with a plurality of seats, integral therewith and with said hub, actuating arms pivotally secured to said hub and frame, and provided with a plurality of seats, helical springs, said seats in alinement and adapted to receive said springs, a helical spring secured intermediate said pivoted arms and adapted to retard the upward movement of said arms, substantially as described.

2. A frame and axle in combination with a resilient structure, a rigid horizontal supporting member secured to said axle, pivoted members secured to said axle and frame, resilient means intermediate said members, springs intermediate said members and spaced equi-distant from the axle, said farthest spring to receive the initial impulse from said frame, said substantially centrally located springs adapted to receive the subsequent impulse of said frame, and said first mentioned spring adapted to retard the return movement of said springs and frame, substantially as described.

In testimony whereof I affix my signature in presence of two witnesses.

PETER B. DONAHOO.

Witnesses:
J. G. ROBBE,
D. H. ROBBE.

Copies of this patent may be obtained for five cents each, by addressing the "Commissioner of Patents, Washington, D. C."